United States Patent
Bhagath

(10) Patent No.: US 9,511,426 B2
(45) Date of Patent: Dec. 6, 2016

(54) CUTTING INSERT, TOOL BODY ON WHICH SAID CUTTING INSERT MAY BE MOUNTED, AND REPLACEABLE-BLADE-TYPE BALL-END MILL PROVIDED THEREWITH

(71) Applicant: TUNGALOY CORPORATION, Iwaki-shi, Fukushima (JP)

(72) Inventor: Kedar Suresh Bhagath, Iwaki (JP)

(73) Assignee: Tungaloy Corporation, Iwaki-shi, Fukushima (JP)

(*) Notice: Subject to any disclaimer, the term of this patent is extended or adjusted under 35 U.S.C. 154(b) by 236 days.

(21) Appl. No.: 14/409,505

(22) PCT Filed: Jun. 20, 2013

(86) PCT No.: PCT/JP2013/066998
§ 371 (c)(1),
(2) Date: Dec. 19, 2014

(87) PCT Pub. No.: WO2013/191259
PCT Pub. Date: Dec. 27, 2013

(65) Prior Publication Data
US 2015/0196963 A1 Jul. 16, 2015

(30) Foreign Application Priority Data

Jun. 21, 2012 (JP) ................. 2012-139694

(51) Int. Cl.
*B23C 5/20* (2006.01)
*B23C 5/10* (2006.01)
*B23C 5/22* (2006.01)

(52) U.S. Cl.
CPC ........... *B23C 5/1045* (2013.01); *B23C 5/2213* (2013.01); *B23B 2200/3636* (2013.01);
(Continued)

(58) Field of Classification Search
CPC .... B23C 5/1027; B23C 5/1045; B23C 5/2213; B23C 2200/123; B23C 2200/125; B23C 2200/128; B23C 2200/165; B23C 2200/203; B23C 2200/205; B23C 2210/168; B23C 5/1009; B23B 2200/3636
See application file for complete search history.

(56) References Cited

U.S. PATENT DOCUMENTS

2002/0037199 A1* 3/2002 Satran ................... B23C 5/1045
407/54
2010/0124465 A1 5/2010 Morrison et al.
(Continued)

FOREIGN PATENT DOCUMENTS

JP 11-197933 7/1999

OTHER PUBLICATIONS

International Preliminary Report on Patentability (IPRP) dated Dec. 23, 2014 issued in the PCT counterpart application (No. PCT/JP2013/066998).
(Continued)

*Primary Examiner* — Sunil K Singh
*Assistant Examiner* — Alan Snyder
(74) *Attorney, Agent, or Firm* — Womble Carlyle

(57) ABSTRACT

Intersecting ridge lines of the top surface (2) and side surfaces (4a, 4b) of a cutting insert (1) have opposing first and second arcuate cutting edges (8, 10). One intersecting ridge line of the bottom surface (3) and side surface (4a) has a third arcuate cutting edge (9). The first and third cutting edges are on one side and the second cutting edge is on the other side with respect to the middle line. The length between the first and second cutting edges is greater than the length between the third cutting edge and the other intersecting ridge line (11). In a cross section perpendicular to the
(Continued)

middle line, the angle formed by the top surface and a line connecting the first and third cutting edges is different from the angle formed by the top surface and a line connecting the second cutting edge and the ridge line (11).

14 Claims, 20 Drawing Sheets

(52) U.S. Cl.
CPC .. *B23C 2200/125* (2013.01); *B23C 2200/128* (2013.01); *B23C 2200/165* (2013.01); *B23C 2200/203* (2013.01); *B23C 2210/168* (2013.01); *Y10T 407/1924* (2015.01); *Y10T 407/23* (2015.01)

(56) References Cited

U.S. PATENT DOCUMENTS

2011/0243672 A1   10/2011  Kim
2012/0070238 A1    3/2012  Men

OTHER PUBLICATIONS

International Search Report in PCT/JP2013/066998, dated Aug. 6, 2013.
Extended European search report dated Jan. 8, 2016, issued in counterpart PCT application No. PCT/JP2013/066998.

\* cited by examiner

CUTTING INSERT, TOOL BODY ON WHICH SAID CUTTING INSERT MAY BE MOUNTED, AND REPLACEABLE-BLADE-TYPE BALL-END MILL PROVIDED THEREWITH

RELATED APPLICATIONS

This is a 371 US National Phase of International Patent Application No. PCT/JP2013/066998 filed 2013 Jun. 20, and published as WO2013/191259A1 on Dec. 27, 2013, which claims priority to JP 2012-139694, filed Jun. 21, 2012. The contents of the aforementioned applications are incorporated by reference in their entirety.

TECHNICAL FIELD

The present invention relates to a cutting insert, a tool body on which the cutting insert may be mounted, and a replaceable-blade-type ball-end mill, that is, an indexable ball-end mill provided therewith. Particularly, the present invention relates to a cutting insert for a ball-end mill, a tool body suitable for mounting the cutting insert thereon, and an indexable ball-end mill provided therewith.

BACKGROUND ART

An indexable ball-end mill of the two-blade type has been generally known in the related art. However, the market demand for a ball-end mill capable of cutting a workpiece with higher efficiency is developing. In response to the demand, an indexable ball-end mill of the three-blade type is currently proposed. In the ball-end mill of this type, three cutting edges are involved in cutting. Therefore, the ball-end mill of the three-blade type can perform machining with higher efficiency than that of the ball-end mill of the two-blade type.

Patent Literature 1 exemplifies an indexable ball-end mill that can be used as a ball-end mill of a three-blade type. Referring to paragraph [0027] and FIG. 9 of Patent Literature 1, it is suggested that a ball-end mill may be of a three-blade type including two inserts functioning as outer peripheral cutting edges and one insert functioning as a central cutting edge. The two inserts functioning as the outer peripheral cutting edges are of the same kind, and further, each of them has cutting edges at top and bottom surfaces thereof. Therefore, it is suggested that if one of the two cutting edges is abraded, each of the inserts may be turned over at its original mount position of the ball-end mill or the other outer peripheral cutting edges may be switched over.

CITATION LIST

Patent Literature

PTL 1: International Publication No. WO 2010/061988

SUMMARY OF INVENTION

Technical Problem

However, Patent Literature 1 only suggests those matters. It is necessary to prepare the cutting insert for the central cutting edge in addition to the cutting insert for the outer peripheral cutting edge. In other words, it is necessary to control the two kinds of cutting inserts for the outer peripheral cutting edge and the central cutting edge, thereby causing control trouble. Moreover, each of the cutting inserts has only two cutting edges, and therefore, the number of cutting inserts to be used is increased, resulting in an increase in machining cost.

The present invention was developed to solve the above-described problems. An object of the present invention is to provide a cutting insert of one kind that can be used for both of an outer periphery cutting edge and a central cutting edge, an indexable ball-end mill having three cutting inserts of the kind mounted thereon, and a preferred tool body applied to the ball-end mill.

Solution to Problem

In view of the above, according to a first aspect of the present invention, a cutting insert (1) comprising a first surface (2), a second surface (3) opposite to the first surface (2), and a side surface (4) connecting the first surface and the second surface to each other, wherein an intersecting ridge line between the first surface (2) and the side surface (4) includes first and second substantially arcuate ridge lines opposite to each other, the first and second arcuate ridge lines forming first and second arcuate cutting edges (8, 10), respectively;

wherein an intersecting ridge (4) line between the second surface (3) and the side surface includes a third substantially arcuate ridge line, the third arcuate ridge line forming a third arcuate cutting edge (9);

wherein when a line drawn at a middle point between the first and second arcuate cutting edges (8, 10) is defined as a middle line (ML), one (8) of the first and second arcuate cutting edges (8, 10) and the third arcuate cutting edge (9) are located at a side surface (4a) on one side of the middle line (ML) whereas the other (10) of the first and second arcuate cutting edges is located at a side surface (4b) on the other side of the middle line (ML);

wherein the length of a line segment (L1) substantially perpendicular to a tangent drawn on a most expanded portion of each of the first and second arcuate cutting edges (8, 10) is greater than that of a line segment (L2) substantially perpendicular to a tangent drawn on each of a most expanded portion of the third arcuate cutting edge (9) and a most expanded portion of an intersecting ridge line (11) between the second surface (3) and the side surface (4b), the intersecting ridge line (11) being opposite to the third arcuate cutting edge (9); and wherein as viewed in a cross section substantially perpendicular to the middle line (ML), an angle (α) formed between the first surface (2) and a straight line (L3) which connects the one (8) of the first and second arcuate cutting edges (8, 10) to the third arcuate cutting edge (9) is different from an angle (β) formed between the first surface (2) and a straight line (L4) which connects the other (10) of the first and second arcuate cutting edges (8, 10) to the intersecting ridge line (11) between the second surface (3) and the side surface (4b).

Furthermore, according to a second aspect of the present invention, a substantially cylindrical tool body (21) for an indexable ball-end mill (20) includes three insert seats (22) being disposed at tips and being capable of having the cutting insert as recited in any one of claims 1 to 9 mounted thereon, wherein the three insert seats (22) include two insert seats for outer peripheral cutting edges and one insert seat for a central cutting edge;

wherein one of the two insert seats for outer peripheral cutting edges is adapted to mount the cutting insert such that one (8) of the first and second arcuate cutting edges (8, 10) is involved in cutting;

wherein the other of the two insert seats for outer peripheral cutting edges is adapted to mount the cutting insert such that the third arcuate cutting edge (9) is involved in cutting; and wherein the insert seat for a central cutting edge such that the other (10) of the first and second arcuate cutting edges (8, 10) is involved in cutting.

Additionally, according to a third aspect of the present invention, an indexable ball-end mill (20) includes the above tool body (21) and the above cutting insert (1) mounted on the tool body (21) is provided.

Advantageous Effects of Invention

According to the present invention, only one type of cutting insert (1) can be used with respect to the indexable ball-end mill (20) having three cutting edges, thus providing two outer peripheral cutting edges and one central cutting edge. Consequently, it is possible to facilitate tool control and remarkably reduce a cost.

DESCRIPTION OF EMBODIMENTS

Figure 1A:
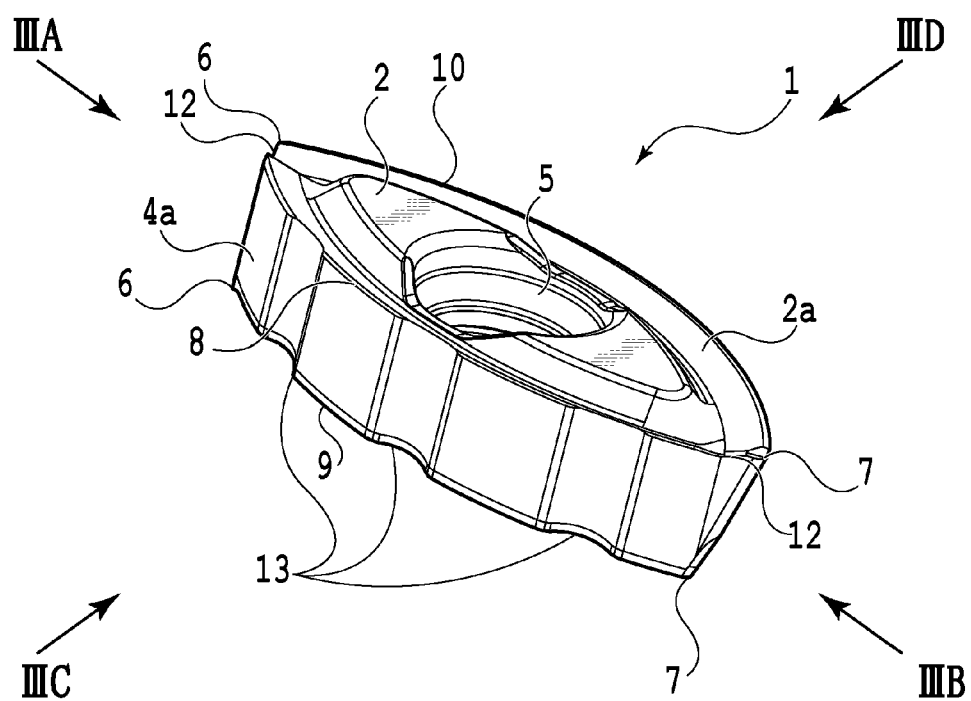
FIG. 1A is a perspective view showing one embodiment of a cutting insert according to the present invention.

A description will be given below of one embodiment of a cutting insert according to the present invention with reference to the attached drawings.

As shown in FIGS. 1A to 1C, 2A, 2B, and 3A to 3D, a cutting insert 1 in the present embodiment basically includes: a first surface (hereinafter referred to as a top surface) 2 formed into a shape having an overlapping portion defined when two circles partly overlap each other, as viewed on a plane (hereinafter referred to as "the overlapping portion of two circles"); a second surface (hereinafter referred to as a bottom surface) 3 that is opposite to the top surface 2 substantially parallel thereto and is formed into substantially the same shape as that of the top surface 2; and a side surface 4 connecting the top surface 2 and the bottom surface 3 to each other. A fixing hole 5 penetrating the top and bottom surfaces 2 and 3 is bored at substantially the center of each of the top and bottom surfaces 2 and 3. The side surface 4 is divided into side surfaces 4a and 4b on the boundary of ridge lines extending from two vertexes (corresponding to two points at which the above-described two circles intersect each other) 6 and 7 of the top surface 2 toward two vertexes 6 and 7 of the bottom surface 3. The side surface 4a substantially perpendicularly intersects the top surface 2 and the bottom surface 3. In contrast, the side surface 4b intersects the top surface 2 at an acute angle whereas the bottom surface 3 at an obtuse angle. In other words, the side surface 4a establishes a negative relationship with the top surface 2 and the bottom surface 3: in contrast, the side surface 4b establishes a positive relationship with the top surface 2 and the bottom surface 3.

Although, as described above, the side surface 4a and the side surface 4b are connected directly to each other on the respective vertexes 6 and 7 of the top and bottom surfaces 2 and 3 in the cutting insert 1 in the present embodiment, the present invention is not limited to this configuration. Specifically, at least either one of the vertexes 6 and 7 may be cut out by a straight line, a curved line, or the like at least at either one of the top surface 2 and the bottom surface 3, as viewed on a plane. In this case, the side surface 4a and the side surface 4b are not connected directly to each other.

Figure 4A:
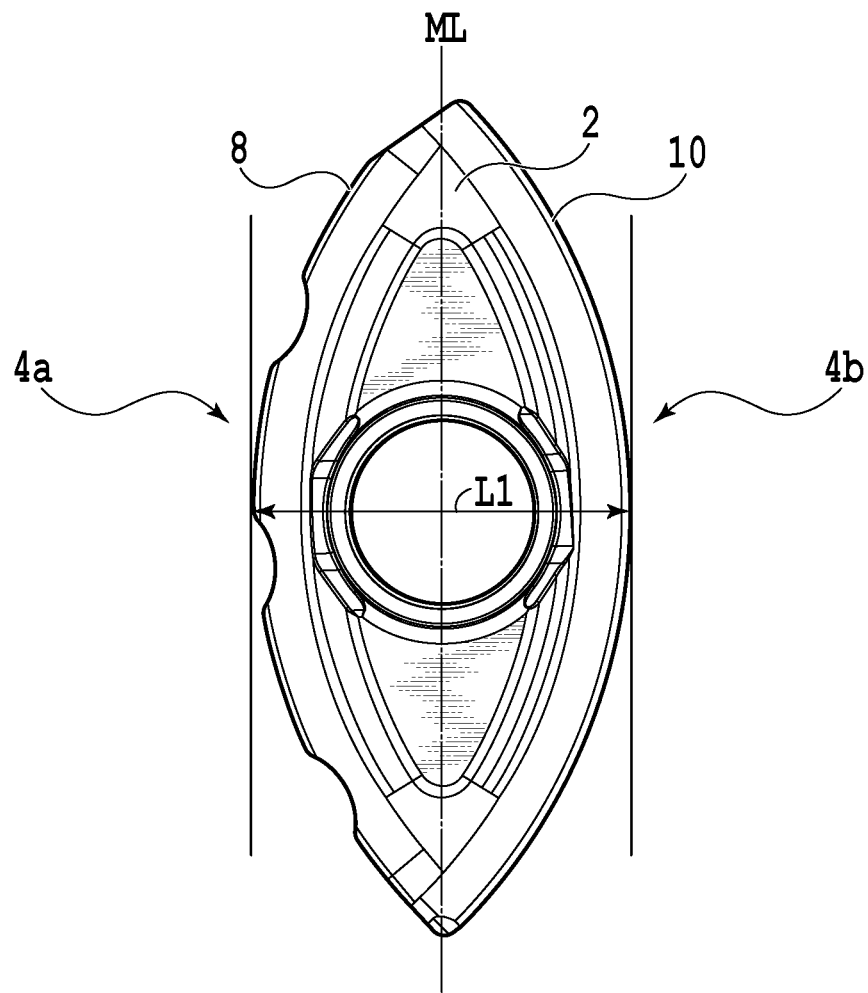
FIG. 4A is a view explanatory of a virtual middle line ML and a virtual line segment L1 drawn on a top surface in the configuration shown in FIG. 2A.
Figure 4B:
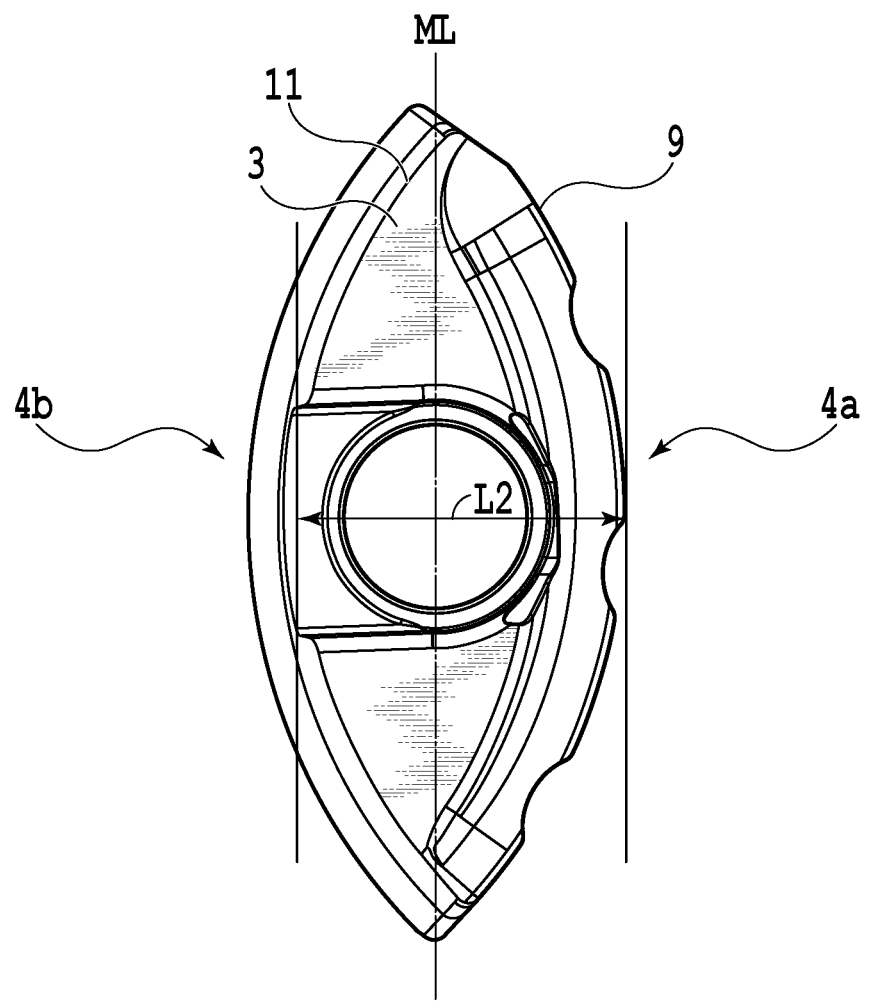
FIG. 4B is a view explanatory of the virtual middle line ML and a virtual line segment L2 drawn on a bottom surface in the configuration shown in FIG. 2B.

In the present embodiment, an arcuate intersecting ridge line defined between the top surface 2 and the side surface 4a functions as a major cutting edge 8 as a first arcuate cutting edge. The major cutting edge 8 functions as an outer peripheral cutting edge in a ball-end mill. The outer peripheral cutting edge signifies a cutting edge that is arranged in such a manner as not to carry out cutting to a tool rotational axis when the cutting insert is mounted on a tool body of a ball-end mill, described later. Moreover, an arcuate intersecting ridge line defined between the bottom surface 3 and the side surface 4a also functions as a major cutting edge (i.e., a third arcuate cutting edge) 9. The major cutting edge 9 is also capable of functioning as another peripheral cutting edge in the ball-end mill. In other words, both of the intersecting ridge lines defined by the side surface 4a and the top and bottom surfaces 2 and 3 function as the outer peripheral cutting edges. An arcuate intersecting ridge line defined between the side surface 4b and the top surface 2 functions as a major cutting edge 10 (i.e., a second arcuate cutting edge). The major cutting edge 10 functions as a central cutting edge in the ball-end mill. The central cutting edge signifies a cutting edge that is arranged to perform cutting up to a region on a tool rotational axis when the cutting insert is mounted on the ball-end mill. Specifically, in the present embodiment, as shown in FIGS. 4A and 4B, when a line drawn on the middle between the two opposite arcuate ridge lines (i.e., the major cutting edges 8 and 10) at the top surface 2 is defined as a middle line ML, the arcuate cutting edge 8 at the top surface 2 and the arcuate cutting edge 9 at the bottom surface 3 are provided at the side surface 4a in one of regions divided along the middle line ML. In contrast, the other arcuate cutting edge 10 at the top surface 2 is provided at the side surface 4b in the other region divided along the middle line ML. Consequently, the cutting insert in the present embodiment includes at least the two major cutting edges 8 and 9 serving as the outer peripheral cutting edges and the one major cutting edge 10 serving as the central cutting edge.

The angles formed between the side surface 4a and the top and bottom surfaces 2 and 3 and the angle formed between the side surface 4b and the top surface 2 are not limited to the above-described angles as long as two relationships below are satisfied. Specifically, the first relationship is as follows, as shown in FIGS. 4A and 4B:

The length of a line that is substantially perpendicular to the tangents of the two arcuate cutting edges 8 and 10 at the top surface 2 and is drawn between the two arcuate cutting edges 8 and 10 (i.e., the length of a line segment L1 drawn between the two arcuate cutting edges 8 and 10 and in a direction substantially perpendicular to tangents drawn along the most expanded portions of the two arcuate cutting edges 8 and 10) is greater than a distance between a tangent drawn along the most expanded portion of the arcuate cutting edge 9 at the bottom surface 3 and a tangent that is opposite to the arcuate cutting edge and is drawn along the most expanded portion of an intersecting ridge line 11 between the bottom surface 3 and the side surface 4b (i.e., the length of a line segment L2 drawn in a direction substantially perpendicular to the tangents and between these tangents).

Figure 5:
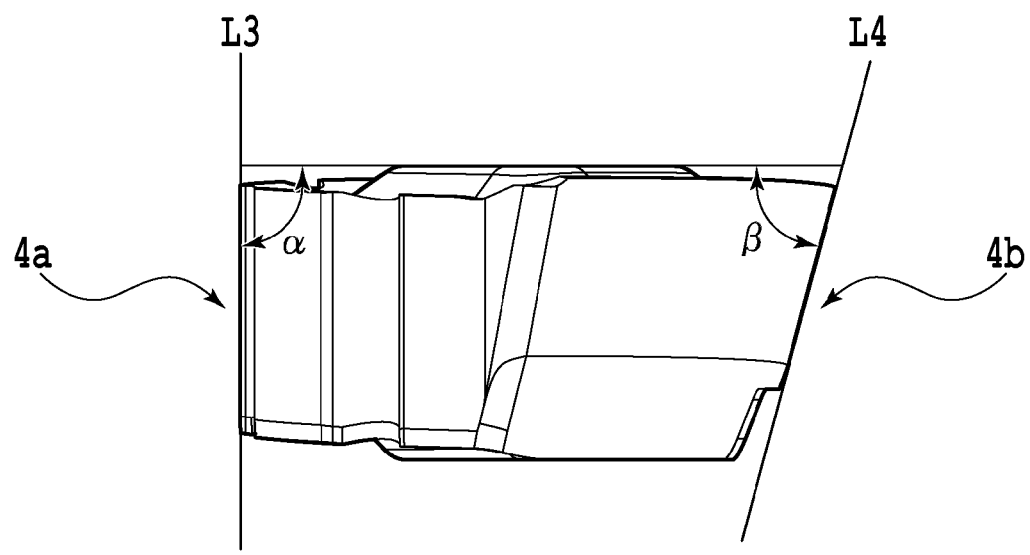
FIG. 5 is a view explanatory of straight lines L3 and L4 and angles α and β defined based on the configuration shown in FIG. 3B.
Figure 6A:
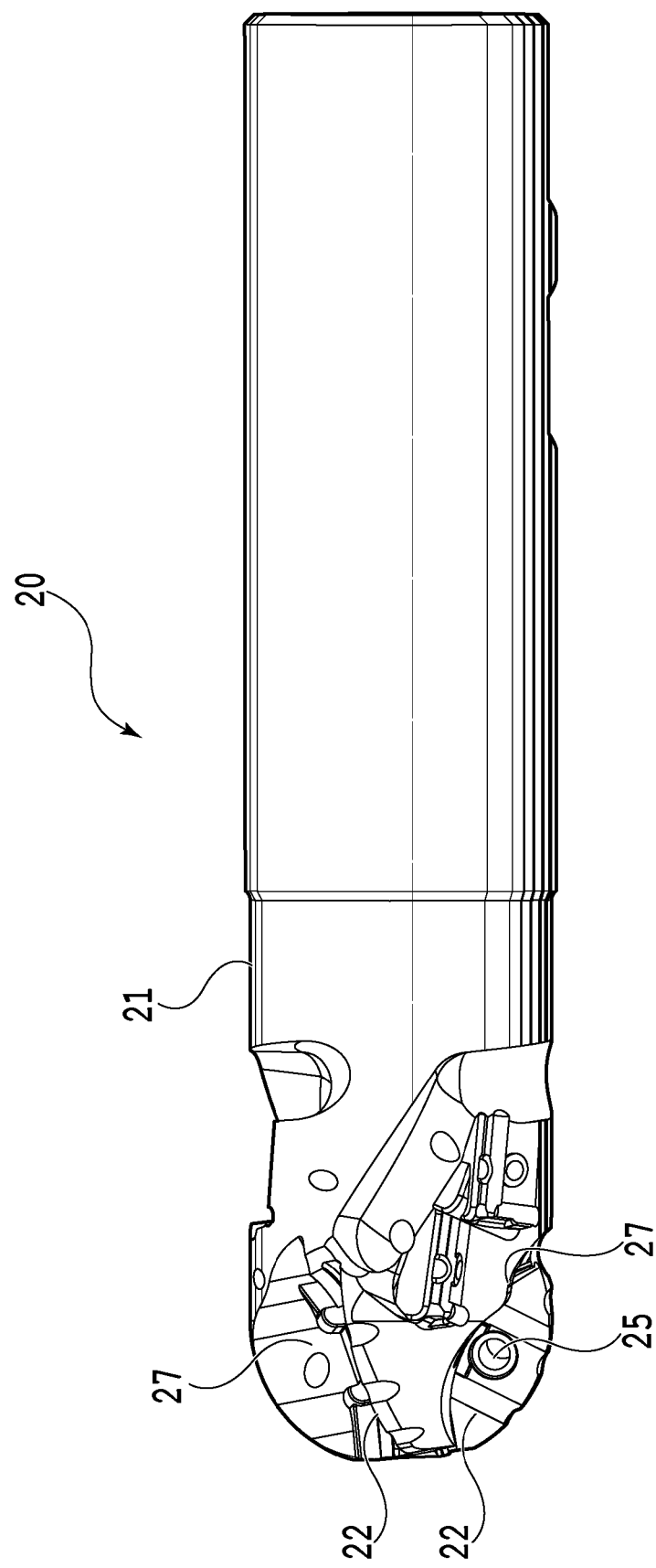
FIG. 6A is a front view showing one embodiment of an indexable ball-end mill according to the present invention.
Figure 6B:
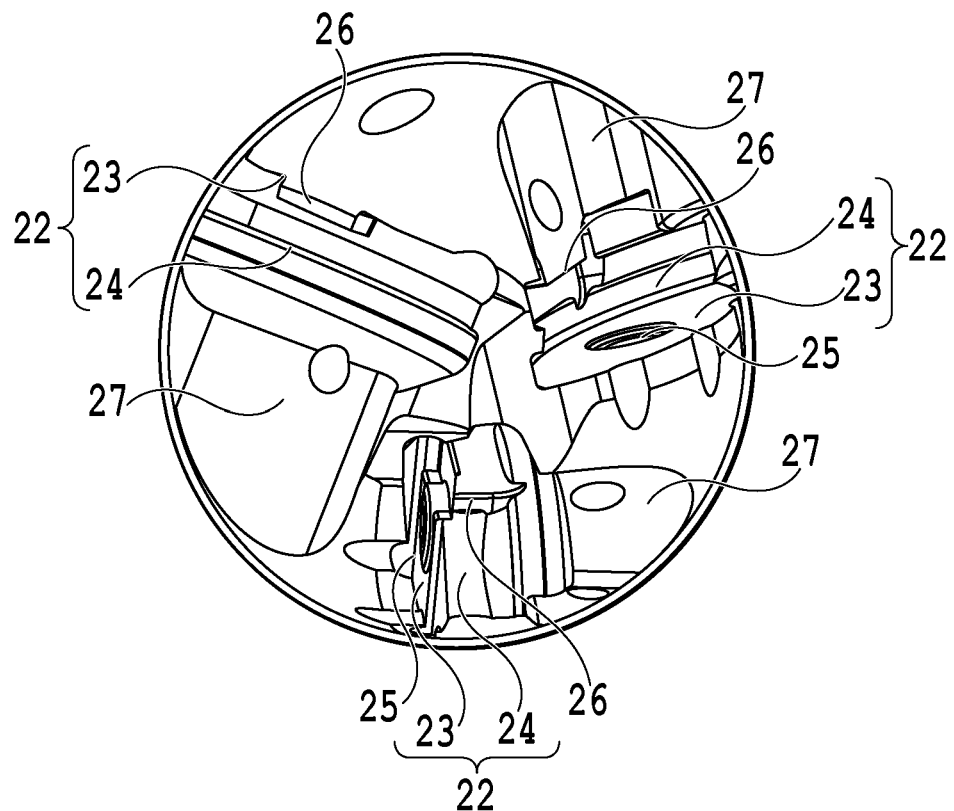
FIG. 6B is a distal end view showing the embodiment of the indexable ball-end mill according to the present invention.

The second relationship is as follows, as shown in FIG. 5:

As viewed in a cross section substantially perpendicular to the middle line ML, an angle α defined between a straight line L3 and the top surface 2 is different from an angle β defined between a straight line L4 and the top surface 2. The straight line L3 connects the arcuate cutting edge 8 formed by the side surface 4a on one side of the middle line ML intersecting the top surface 2 to the arcuate cutting edge 9 defined by the side surface 4a intersecting the bottom surface 3. The straight line L4 connects the arcuate cutting edge 10 formed by the side surface 4b on the other side of the middle line ML intersecting the top surface 2 to the intersecting ridge line 11 at the bottom surface 3.

As long as the above-described two relationships are satisfied, the angle formed between the side surface 4a or 4b and the top surface 2 or the bottom surface 3 may be appropriately varied.

Flank portions 12 are formed at both ends of each of the major cutting edges 8 and 9 functioning as the outer peripheral cutting edges, that is, the ends near the vertexes 6 and 7. The flank portions 12 do not function as cutting edges. As a consequence, the arcuate length of each of the major cutting edges 8 and 9 functioning as the outer peripheral cutting edges is smaller than that of the major cutting edge 10 functioning as the central cutting edge. The flank portions 12 are formed to prevent both ends of the outer peripheral cutting edge from protruding onto a side of a tool body beyond the middle line when the cutting inserts 1 in the present embodiment are mounted on the ball-end mill, unlike the central cutting edge.

The top surface 2 functions as a rake surface for the two major cutting edges 8 and 10 formed at the top surface 2. In this case, the bottom surface 3 functions as an insert fixing surface that abuts against the tool body. Moreover, when the major cutting edge 8 defined by the top surface 2 and the side surface 4a acts as a cutting edge, the side surface 4a functions as a flank surface whereas the side surface 4b functions as an insert fixing surface that abuts against the tool body. In the meantime, when the major cutting edge 10 defined by the top surface 2 and the side surface 4b acts as a cutting edge, the side surface 4b functions as a flank surface whereas the side surface 4a functions as an insert fixing surface that abuts against the tool body. In contrast, the bottom surface 3 also functions as a rake surface for the major cutting edge 9 formed at the bottom surface 3. In this case, the top surface 2 functions as an insert fixing surface that abuts against the tool body. The side surface 4a functions as the flank surface whereas the side surface 4b functions as the insert fixing surface that abuts against the tool body.

Figure 1B:
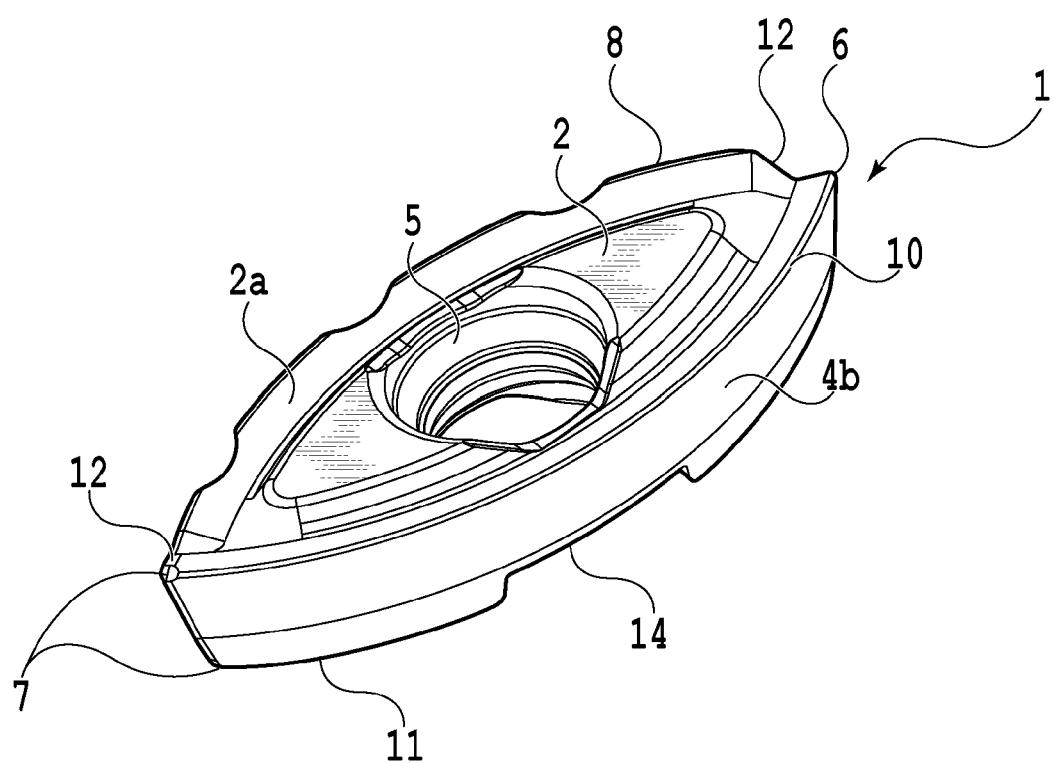
FIG. 1B is a perspective view showing the embodiment of the cutting insert according to the present invention, as viewed from above in a different direction from that of FIG. 1A.

As shown in FIGS. 1A and 1B, an inclined surface 2a that is inclined toward the bottom surface 3 as it is separated inward of the cutting insert from the major cutting edges 8 and 10 may be formed at the top surface 2. The inclined surface 2a forms a rake angle at the rake surface. The inclined surface 2a may be inclined at a predetermined distance from the major cutting edges 8 and 10, and then, may be continuous to a boss surface. In the same manner, an inclined surface 3a that is inclined toward the top surface 2 as it is separated from the major cutting edge 9 may be formed at the bottom surface 3. The inclined surface 3a forms a rake angle at a rake surface. The inclined surface 3a may be inclined at a predetermined distance from the major cutting edge 9, and then, may be continuous to a boss surface. The inclination angle (i.e., the rake angle), the inclination width, and the like of each of the inclined surfaces may be appropriately varied in view of cutting performance to be expected and the like.

Nicks 13 may be formed at the side surface 4a. In the present embodiment, each of the nicks 13 is formed linearly at the side surface 4a and between the top surface 2 and the bottom surface 3 to substantially vertically cross the major cutting edges 8 and 9. Additionally, as viewed from the top surface 2 or the bottom surface 3, each of the nicks 13 has a semicircular cross section, and further, the three nicks 13 are arranged at substantially equal intervals. Although the nicks 13 are formed only at the major cutting edges 8 and 9 in the present embodiment, nicks 13 may be formed at the major cutting edge 10 defined by the top surface 2 and the side surface 4b. The shape, number, or arrangement interval of the nicks 13 is not limited to those as described above, and therefore, they may be appropriately varied in view of the cutting performance to be expected or the like.

At least one of the major cutting edges 8, 9, and 10 defined at the top surface 2 and/or the bottom surface 3 may be configured to be inclined toward the center of the cutting edge from the vertexes 6 and 7 along the major cutting edge 8, 9, or 10 in such a manner that the cutting insert 1 gradually becomes thinner or thicker. Specifically, an inclination may be formed at the major cutting edge 8, 9, or 10.

Figure 1C:
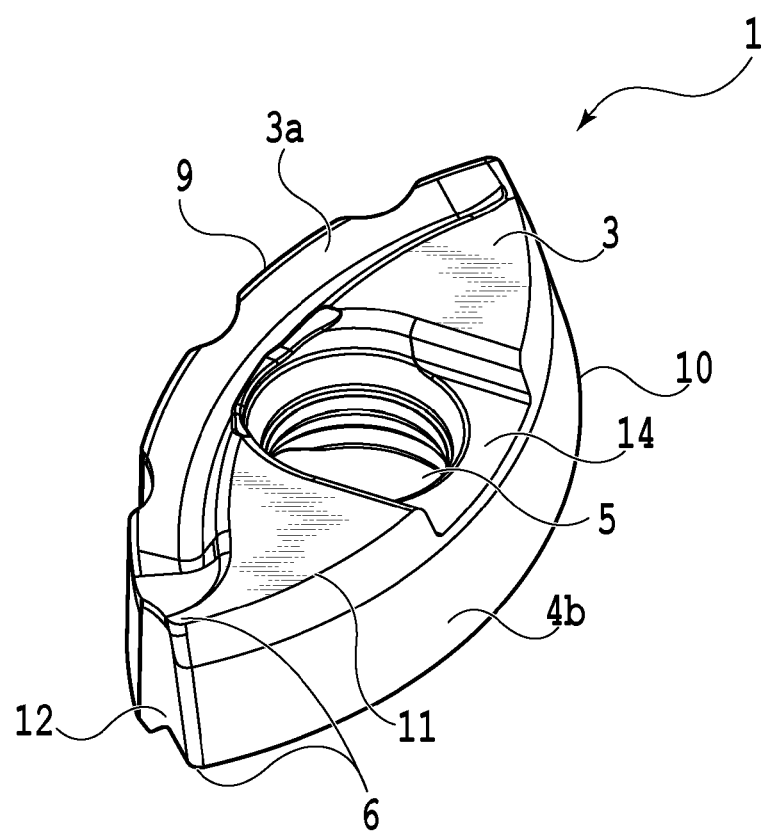
FIG. 1C is a perspective view showing the embodiment of the cutting insert according to the present invention, as viewed from below.
Figure 2A:
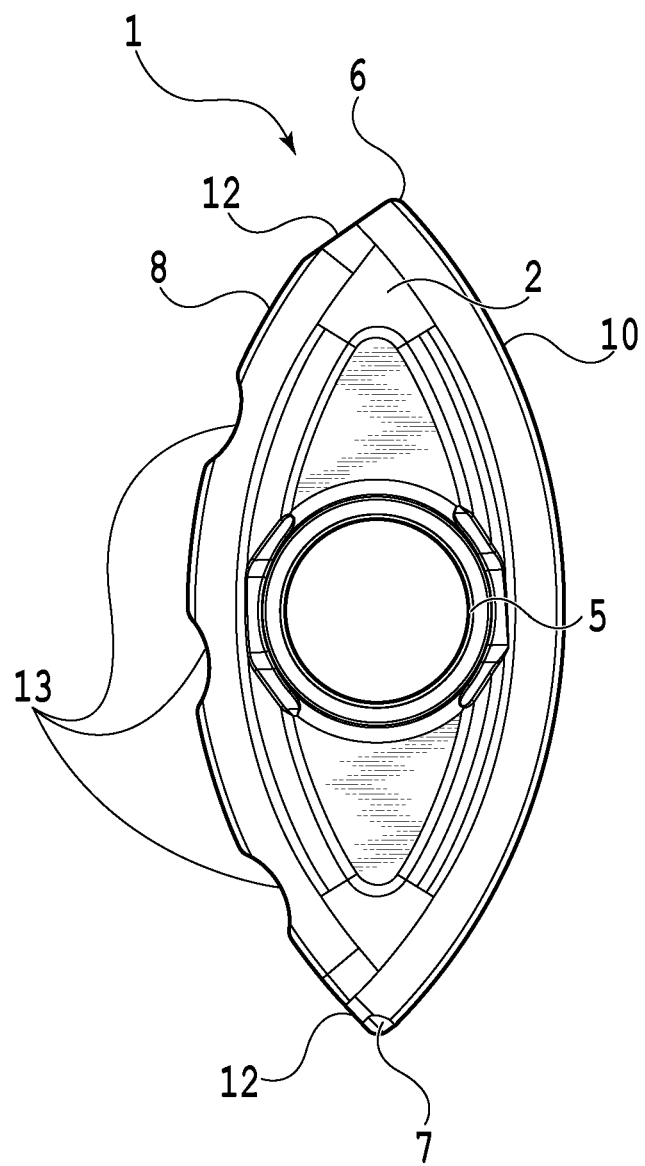
FIG. 2A is a top view showing the embodiment of the cutting insert according to the present invention.
Figure 2B:
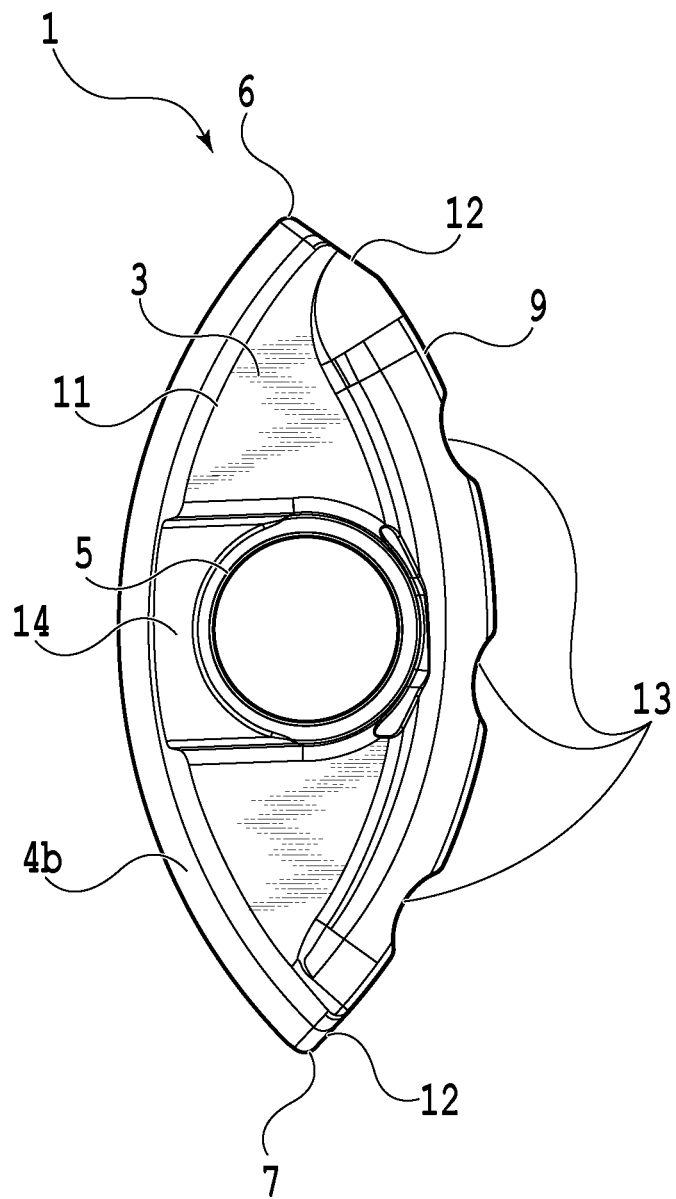
FIG. 2B is a bottom view showing the embodiment of the cutting insert according to the present invention.
Figure 3A:
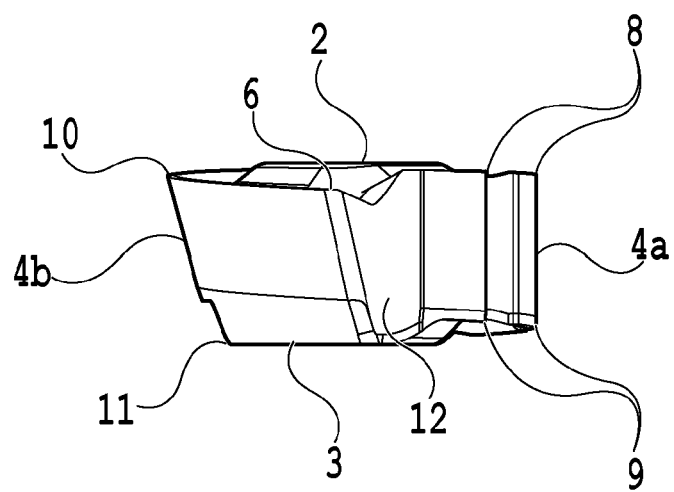
FIG. 3A is a side view showing the embodiment of the cutting insert according to the present invention, as viewed in a direction indicated by an arrow IIIA of FIG. 1A.
Figure 3B:
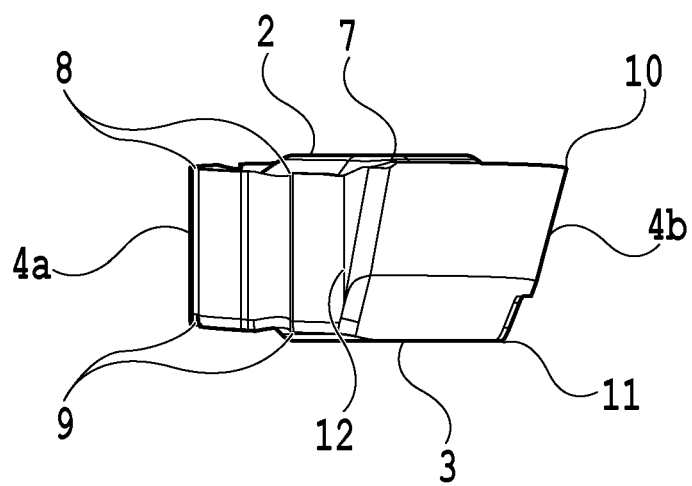
FIG. 3B is a side view showing the embodiment of the cutting insert according to the present invention, as viewed in a direction indicated by an arrow IIIB of FIG. 1A.
Figure 3C:
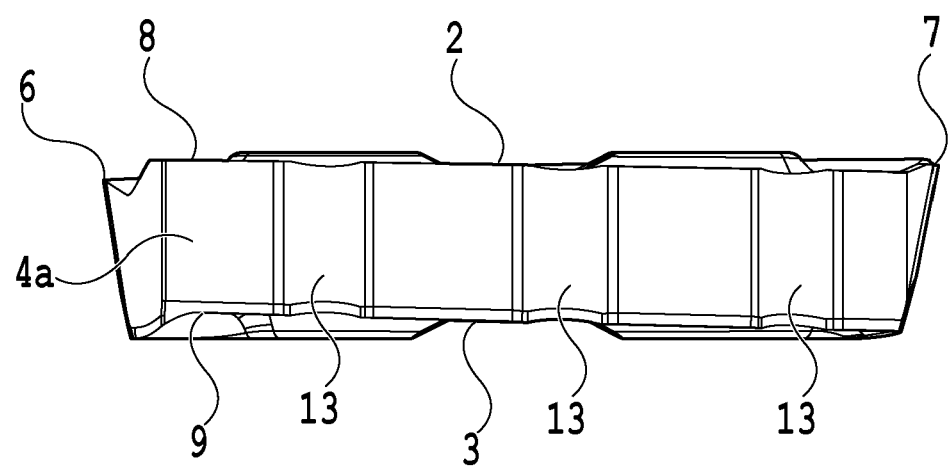
FIG. 3C is a side view showing the embodiment of the cutting insert according to the present invention, as viewed in a direction indicated by an arrow IIIC of FIG. 1A.
Figure 3D:
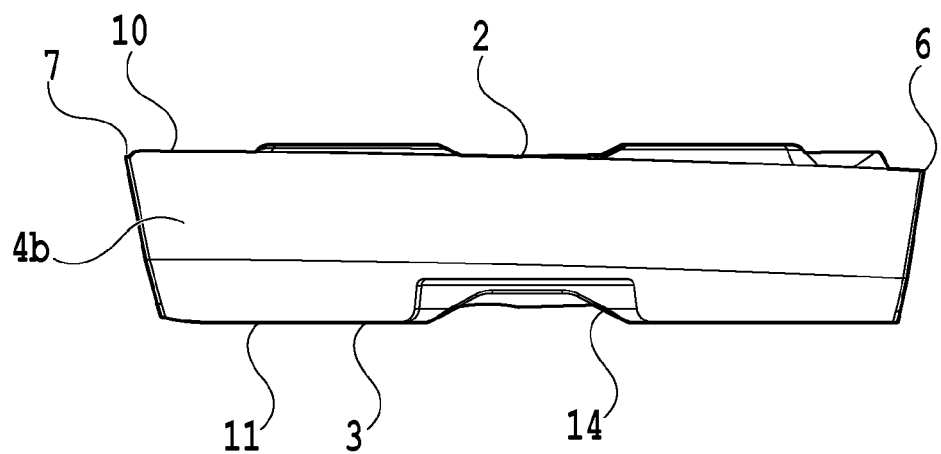
FIG. 3D is a side view showing the embodiment of the cutting insert according to the present invention, as viewed in a direction indicated by an arrow IIID of FIG. 1A.

As shown in FIG. 1C, it is preferable to form, at the bottom surface 3, a recess 14 along a part of the side surface 4b. In the present embodiment, the recess 14 is formed at the bottom surface 3 in a width equal to the diameter of the fixing hole 5 from the fixing hole 5 to the side surface 4b. Consequently, as the cutting insert 1 in the present embodiment is viewed sideways as shown in FIG. 3D, the intersecting ridge line 11 between the bottom surface 3 and the side surface 4b is partly cut out near substantially the center thereof. The recess 14 formed at the bottom surface 3 functions as an anti-rotation mechanism and a misplacement prevention mechanism for the cutting insert 1 when the cutting insert 1 in the present embodiment is mounted on the tool body. The width, cutout depth, or the like of the recess 14 may be appropriately varied as long as the recess 14 exhibits the function as the anti-rotation mechanism and the misplacement preventing mechanism. The recess 14 is formed on the intersecting ridge line 11 between the side surface 4b and the bottom surface 3, and therefore, it does not inhibit the functions of the three major cutting edges 8, 9, and 10 to be used.

The cutting insert 1 in the present embodiment comprising the above-described configuration has functions and advantageous results, as described below.

As described above, the cutting insert 1 in the present embodiment includes the major cutting edge 8 functioning as the outer peripheral cutting edge and the major cutting edge 10 functioning as the central cutting edge at the top surface 2, and further, the major cutting edge 9 functioning as the outer peripheral cutting edge at the bottom surface 3. These major cutting edges 8, 9, and 10 satisfy the above-described two relationships. In this manner, in the indexable ball-end mill of a three-blade type, the top and bottom surfaces are appropriately reversed and a proximal end and a distal end are appropriately reversed, so that only one kind of cutting insert 1 can include the functions of all of the three cutting edges for the ball-end mill. Preferably, as the cutting insert 1 is viewed along the cross section substantially perpendicular to the middle line ML, the angle β formed between the side surface 4b on the other side of the middle line ML and the top surface 2, that is, the angle β formed between the top surface 2 and the straight line L4 which connects the arcuate cutting edge 10 on the top surface 2 to the intersecting ridge line 11 on the bottom surface 3 side should be acute, as described above. In other words, it is preferable that a positive relationship should be established between the top surface 2 and the side surface 4b. This is because the major cutting edge 10 functioning as the central cutting edge having a large cutting region is positive, thus enabling the cutting performance of the ball-end mill to be further enhanced. Much preferably, the angle α formed between the side surface 4a on the one side of the middle line ML and the top or bottom surface 2 or 3, that is, the angle α formed between the top or bottom surface 2 or 3 and the straight line L3 which connects the arcuate cutting edge 8 on the top surface 2 side and the arcuate cutting edge 9 on the bottom surface 3 side is approximately a right angle, as described above. In other words, it is much preferable that the major cutting edge 10 functioning as the central cutting edge should be a positive type, and further, that the side surface 4a should cross each of the top and bottom surfaces 2 and 3 at substantially right angles such that the two major cutting edges 8 and 9 functioning as the outer peripheral cutting edges should be a negative type. In this manner, either one of the two major cutting edges 8 and 9 functioning as the outer peripheral cutting edges does not become completely negative (i.e., a flank angle of less than 0°), and consequently, the three cutting edges 8, 9, and 10 can exhibit the optimum cutting ability as a whole. Moreover, the outer peripheral cutting edge also is a cutting edge in charge of rough machining, and therefore, it should be preferably negative with a great cutting strength.

Additionally, the recess 14 is formed at the bottom surface 3, thereby suppressing rotational deviation of the cutting insert 1, mounted on the tool body, caused by cutting resistance. Furthermore, the formation of the recess 14 can prevent a worker from misplacing the cutting insert 1. These functions and advantageous results will be described later.

Furthermore, the nicks 13 may be formed at the major cutting edges 8, 9, and 10, thereby enabling chips to be finely fractured. However, it is preferable that the nicks 13 should be formed only at the major cutting edges 8 and 9 functioning as the outer peripheral cutting edges. This is because the central cutting edge widely involved in cutting in the vicinity of the rotary center axis is a continuous cutting edge without any nicks so as to enhance the fineness of the entire cut surface of a workpiece.

Next, a description will be given of a three-blade type indexable ball-end mill 20, on which the above-described cutting inserts 1 is mounted, with reference to the attached drawings.

As shown in FIGS. 6A to 12, the indexable ball-end mill 20 in the present embodiment is of a three-blade type. Three insert seats 22 are disposed at the tip portion of a substantially cylindrical tool body 21. Three chip pockets 27 are formed adjacent to the three insert seats 22, respectively. The three insert seats 22 may be disposed at substantially the equally or unequally angular intervals as the substantially cylindrical tool body 21 is viewed from the distal end, as shown in FIG. 6B. Each of the insert seats 22 includes a bottom surface 23 and a side surface 24 that have a shape in conformity with the outline of the above-described cutting insert 1. A screw hole 25 for mounting the cutting insert 1 is formed substantially near the center of the insert seat bottom surface 23. The cutting insert 1 is mounted such that the top surface 2 or the bottom surface 3 abuts against the insert seat bottom surface 23 whereas the side surface 4a or the side surface 4b abuts against the insert seat side surface 24. At this time, each of the three cutting inserts 1 can be mounted such that any of the major cutting edges 8, 9, and 10 are involved in cutting.

When the cutting insert 1 is mounted such that the major cutting edge 8 functioning as the outer peripheral cutting edge on the side of the top surface 2 is involved in cutting, the top surface 2 serves as a rake face, whereas the side surface 4a serves as a flank. Accordingly, the bottom surface 3 and the side surface 4b function as abutment surfaces in contact with the bottom surface 23 and side surface 24 of the insert seat 22, respectively. In this case, the bottom surface 23 and side surface 24 of the insert seat 22 are designed to have a shape suitable for the contact, and further, the side surface 24 has an inclination crossing the bottom surface 23 at an obtuse angle. When the cutting insert 1 is mounted such that the major cutting edge 9 functioning as the outer peripheral cutting edge on the side of the bottom surface 3 is involved in cutting, the bottom surface 3 serves as a rake whereas the side surface 4a serves as a flank. Accordingly, the top surface 2 and the side surface 4b function as abutment surfaces in contact with the bottom surface 23 and side surface 24 of the insert seat 22, respectively. In this case, the bottom surface 23 and side surface 24 of the insert seat 22 are designed to have a shape suitable for the contact, and further, the side surface 24 has an inclination crossing the bottom surface 23 at an acute angle. When the cutting insert 1 is mounted such that the major cutting edge 10 functioning as the central cutting edge on the side of the top surface 2 is involved in cutting, the top surface 2 serves as a rake whereas the side surface 4b serves as a flank. Accordingly, the bottom surface 3 and the side surface 4a function as abutment surfaces in contact with the bottom surface 23 and side surface 24 of the insert seat 22, respectively. In this case, the bottom surface 23 and side surface 24 of the insert seat 22 are designed to have a shape suitable for the contact, and further, the side surface 24 substantially perpendicularly crosses the bottom surface 23.

In the case where the nicks 13 are formed at the major cutting edges 8 and 9 functioning as the outer peripheral cutting edges, the cutting inserts 1 are mounted on the ball-end mill 20 such that the rotational trails of the nicks at the major cutting edge 8 functioning as one outer peripheral cutting edge do not overlap those of the nicks at the major cutting edge 9 functioning as the other outer peripheral cutting edge. Specifically, the cutting inserts 1 are mounted on the ball-end mill 20 such that the trails of the nicks 13 at the two major cutting edges 8 and 9 functioning as the outer peripheral cutting edges do not cross each other on the rotational trail when the ball-end mill 20 is rotated. As a consequence, a portion remaining uncut due to the nick 13 is cut by the other cutting edge, thereby preventing a workpiece from remaining uncut.

Figure 7:
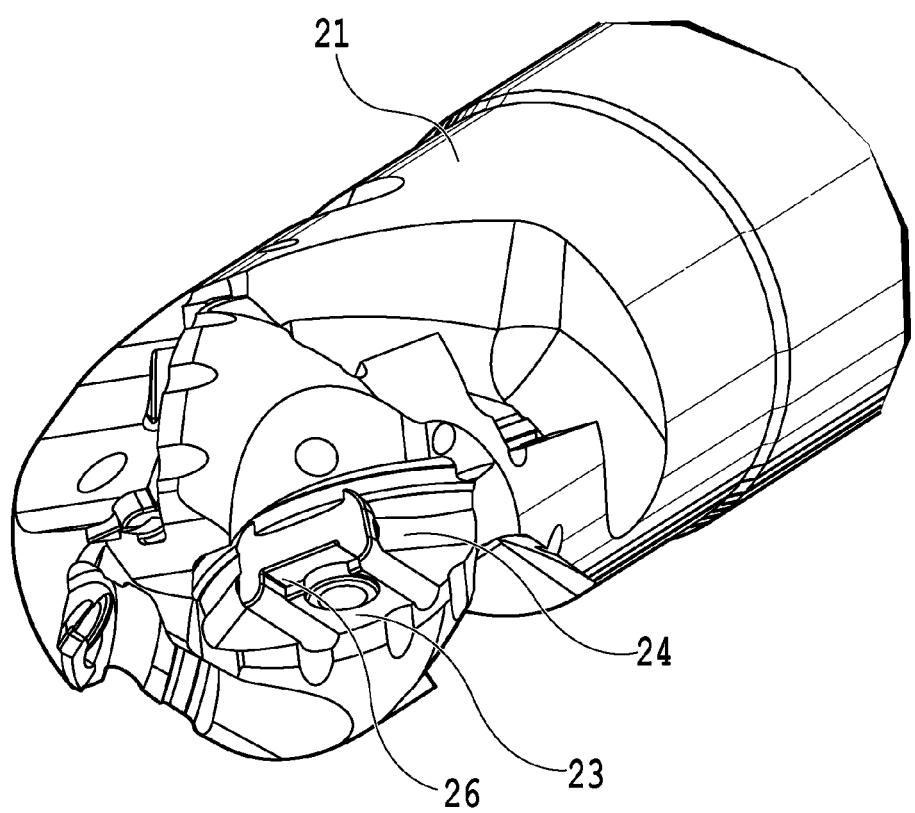
FIG. 7 is an enlarged view showing the vicinity of an insert seat, on which the cutting insert is to be mounted in such a manner that an outer peripheral cutting edge at a top surface is involved in cutting.
Figure 10:
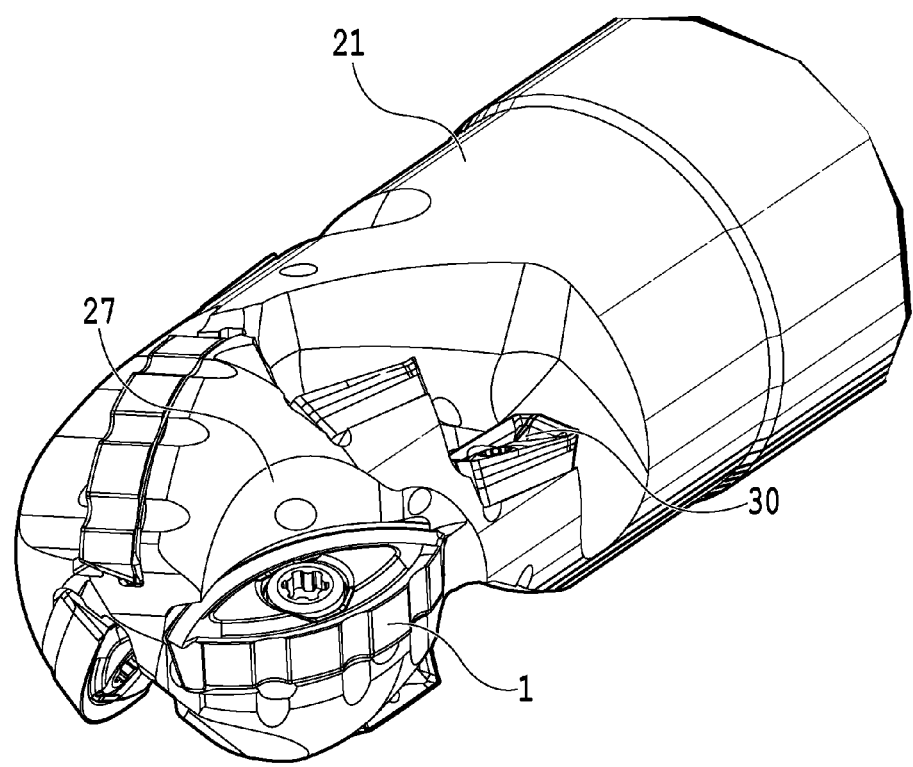
FIG. 10 is another enlarged view showing the vicinity of an insert seat, on which the cutting insert is mounted in such a manner that an outer peripheral cutting edge at a top surface is involved in cutting.

In the case where the recess 14 is formed at the bottom surface 3 of the cutting insert 1, a projection 26 is formed at each of the three insert seats 22 so as to conform to the recess 14 which has a different position according to the mounting condition of the cutting insert 1. Specifically, as shown in FIG. 7, at the insert seat bottom surface 23 of the insert seat 22 in which the cutting insert 1 is mounted such that the major cutting edge 8 functioning as the outer peripheral cutting edge on the side of the top surface 2 is involved in cutting, the projection 26 in conformity with the recess 14 formed at the bottom surface 3 of the cutting insert 1 is formed from substantially the center portion of the intersecting ridge line between the insert seat bottom surface 23 and the insert seat side surface 24 up to the screw hole 25. The length (i.e., the width) of the projection 26 along the intersecting ridge line is substantially equal to the width of the recess 14 of the cutting insert 1. Since the recess 14 of the cutting insert 1 and the projection 26 of the insert seat 22 engage with each other, the cutting insert 1 can be mounted on the insert seat 22 such that the major cutting edge 8 functioning as the outer peripheral cutting edge on the side of the top surface 2 is involved in cutting, as shown in FIG. 10.

Figure 8:
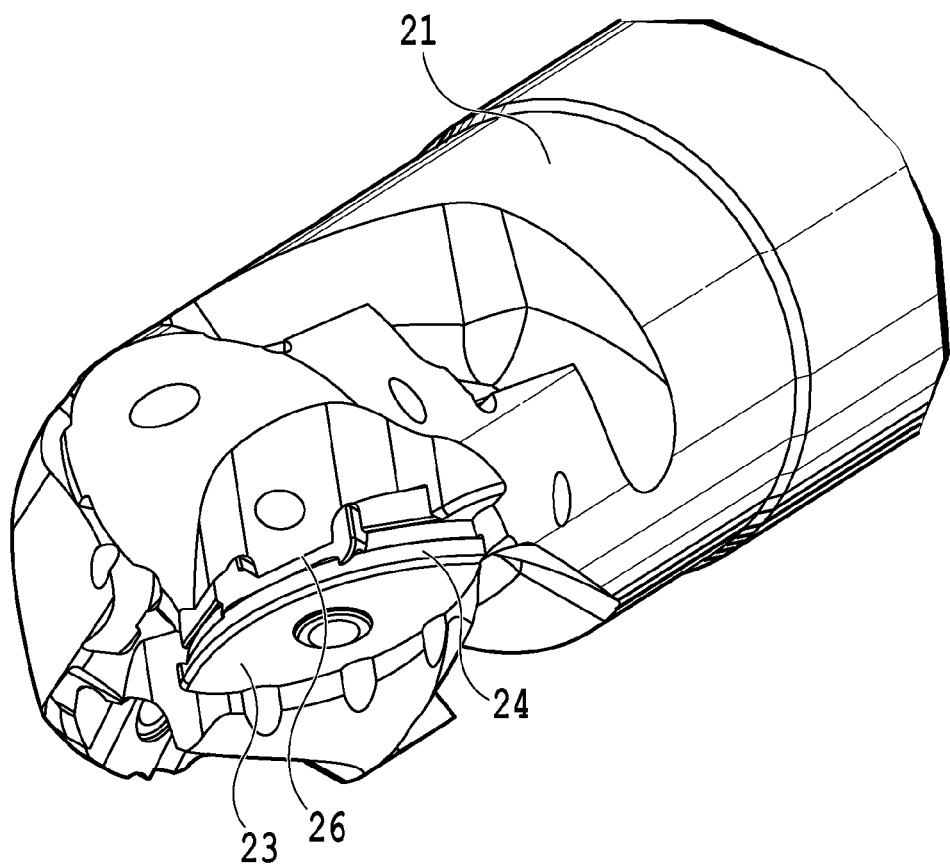
FIG. 8 is an enlarged view showing the vicinity of an insert seat, on which the cutting insert is to be mounted in such a manner that an outer peripheral cutting edge at a bottom surface is involved in cutting.
Figure 11:
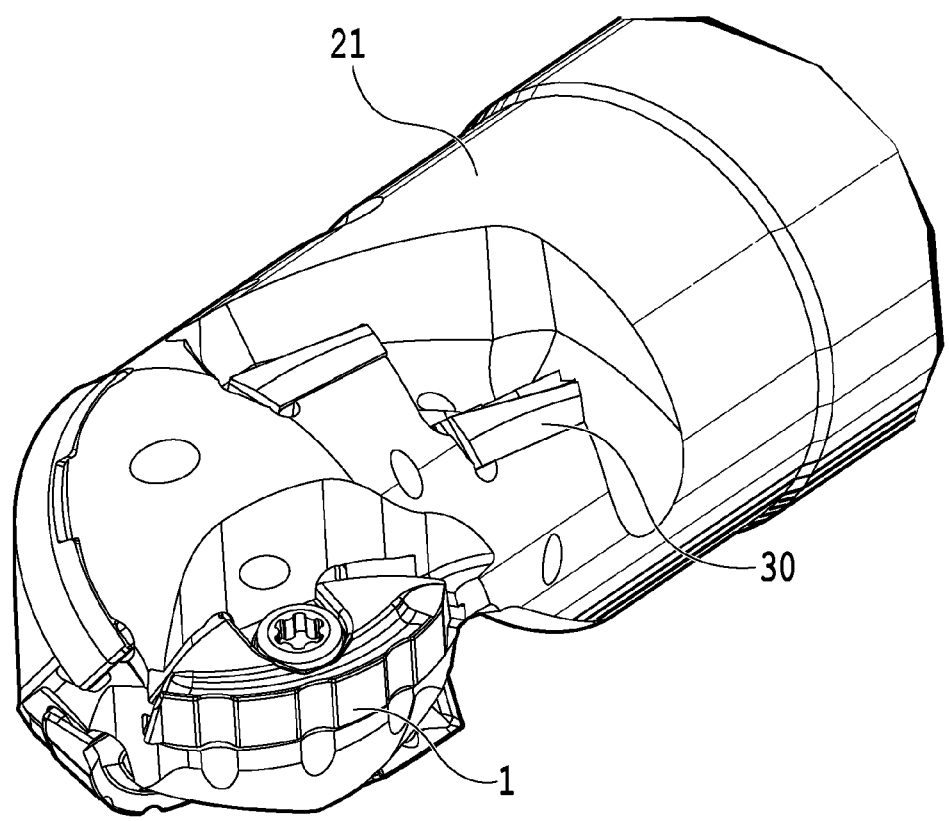
FIG. 11 is another enlarged view showing the vicinity of an insert seat, on which the cutting insert is mounted in such a manner that an outer peripheral cutting edge at a bottom surface is involved in cutting.

Furthermore, as shown in FIG. 8, at the insert seat side surface 24 of the insert seat 22 in which the cutting insert 1 is mounted such that the major cutting edge 9 functioning as the outer peripheral cutting edge on the side of the bottom surface 3 is involved in cutting, the projection 26 is formed at a portion apart by a predetermined distance from the insert seat bottom surface 23 at substantially the center portion of the intersecting ridge line between the insert seat bottom surface 23 and the insert seat side surface 24. More specifically, the insert seat side surface 24 is cut out at an angle in conformity with the side surface 4b of the cutting insert 1, wherein the projection 26 projecting toward the insert seat bottom surface 23 remains at a part thereof. The projection 26 formed by such a cutout is formed in a height in which the projection 26 can engage with the recess 14 of the cutting insert 1 whereas its width is substantially the same as that of the recess 14 of the cutting insert 1. Since the recess 14 of the cutting insert 1 and the projection 26 of the insert seat 22 engage with each other, the cutting insert 1 is mounted on the insert seat 22 such that the major cutting edge 9 functioning as the outer peripheral cutting edge on the side of the bottom surface 3 is involved in cutting, as shown in FIG. 11.

Figure 9:
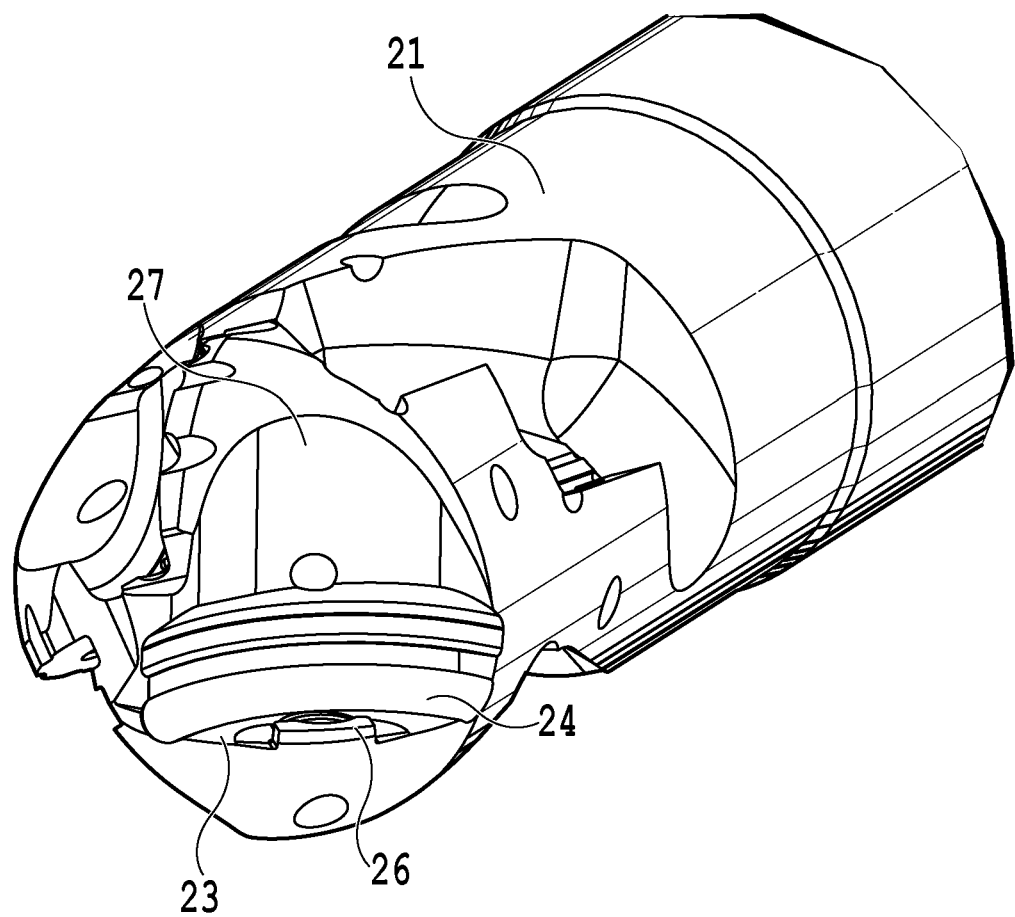
FIG. 9 is an enlarged view showing the vicinity of an insert seat, on which the cutting insert is to be mounted in such a manner that a central cutting edge is involved in cutting.
Figure 12:
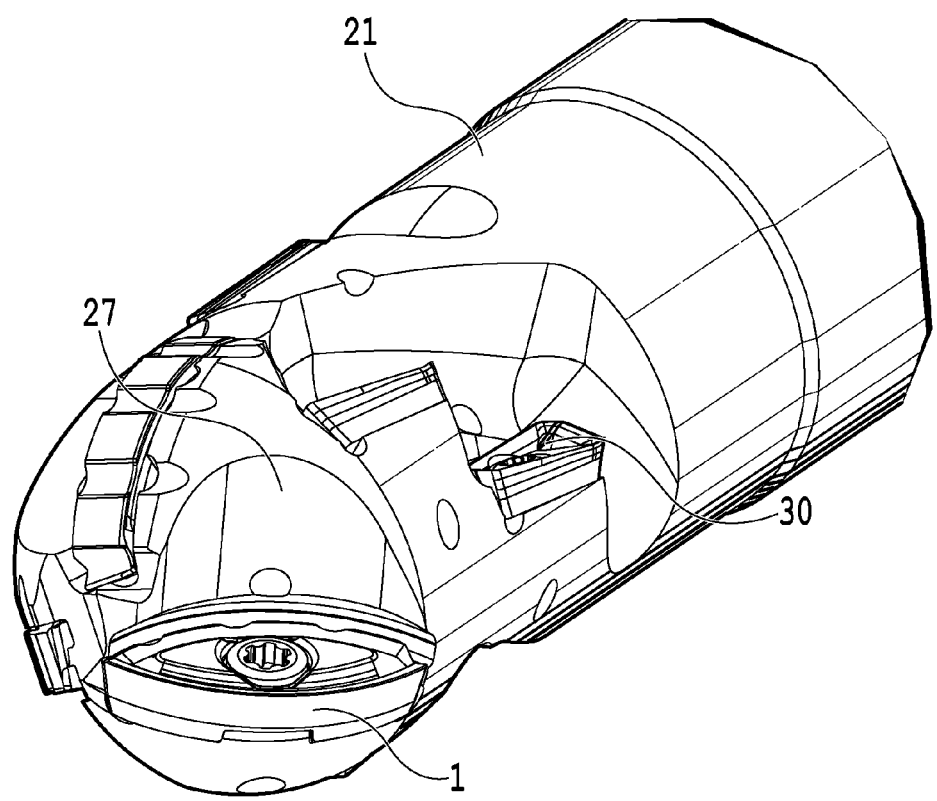
FIG. 12 is another enlarged view showing the vicinity of an insert seat, on which the cutting insert is mounted in such a manner that a central cutting edge is involved in cutting.

Additionally, as shown in FIG. 9, at the bottom surface 23 of the insert seat 22 in which the cutting insert 1 is mounted such that the major cutting edge 10 functioning as the central cutting edge at the top surface 2 is involved in cutting, the projection 26 is formed from substantially the center portion of the intersecting ridge line between the insert seat bottom surface 23 and the outer peripheral surface of the tool body 21 up to the screw hole 25. The length (i.e., the width) of the projection 26 along the intersecting ridge line is substantially equal to the width of the recess 14 of the cutting insert 1. Since the recess 14 of the cutting insert 1 and the projection 26 of the insert seat 22 engage with each other, the cutting insert 1 is mounted at the insert seat 22 such that the major cutting edge 10 functioning as the central cutting edge is involved in cutting, as shown in FIG. 12.

The shape of the projection 26 of the insert seat 22 may be appropriately varied according to the recess 14 of the cutting insert 1, and therefore, is not limited to the above described shape shown in the drawings.

The engagement between the recess 14 of the cutting insert 1 and the projection 26 of the insert seat 22 can produce the following two advantageous results.

One of the advantageous results is to prevent the cutting insert 1 from being rotated on the insert seat 22. Since the cutting insert 1 is formed in a shape of two overlapping circles, as viewed on a plane, the major cutting edges 8, 9, and 10 have an arcuate shape. Therefore, the cutting insert 1 may be rotated and shifted on the fixing hole 5 because of cutting resistance. When the cutting insert 1 is moved in such a manner as described above, the cutting precision may be degraded. However, the formation of the recess 14 and the projection 26 for allowing the cutting insert 1 and the insert seat 22 to engage with each other in the above-described manner can suppress the rotation of the cutting insert 1. In the case where the engagement portion is located on the intersecting ridge line of the cutting insert 1 (i.e., outside), the rotation suppression effect can be further increased.

The other advantageous result is to prevent the misplacement of the cutting insert 1 by a worker. While the three cutting inserts 1 to be mounted on the ball-end mill 20 are of the same type according to the present invention, the major cutting edges 8, 9, and 10 are classified into the outer peripheral cutting edge and the central cutting edge. As a consequence, the cutting insert 1 of the same type is reused as both of the outer peripheral cutting edge and the central cutting edge, and therefore, the worker is required to mount the cutting insert 1 on the proper insert seat 22 in a proper orientation in such a manner that the major cutting edge according to the usage is involved in cutting, but a misplacement possibly occurs in the mounting work. If the cutting insert 1 is misplaced, a desirable cutting performance cannot be achieved. In contrast, like the present embodiment, the orientations of the cutting insert 1 and the insert seat 22 correspond to each other one by one, that is, the cutting insert 1 can be mounted on a specified insert seat 22 only in a specified orientation, thus preventing any misplacement by the worker. Here, in the present embodiment, the reuse of the cutting insert 1 of the same type signifies a change in placement, as follows: for example, the cutting insert 1 which has been mounted in such a manner that the outer peripheral cutting edge 8 is involved in cutting (a state shown in FIG. 10), the cutting insert 1 which has been mounted in such a manner that the other peripheral cutting edge 9 is involved in cutting (a state shown in FIG. 11), and the cutting insert 1 which has been mounted in such a manner that the central cutting edge 10 is involved in cutting (a state shown in FIG. 12) are mounted on the insert seat 22 in such a manner that the other peripheral cutting edge 9 is involved in cutting (the state shown in FIG. 11), the insert seat 22 in such a manner that the central cutting edge 10 is involved in cutting (the state shown in FIG. 12), and the insert seat 22 in such a manner that the outer peripheral cutting edge 8 is involved in cutting (the state shown in FIG. 10), respectively. Consequently, it is possible to make full use of the cutting insert 1 of the same type.

Moreover, as shown in FIGS. 10 to 12, an additional insert seat 30 capable of mounting an additional cutting insert thereon is disposed at the proximal side of the tool body 21, as viewed from the chip pocket 27. This embodiment is configured such that a pair of substantially rectangular cutting inserts is disposed at the proximal side of the tool body 21. In this manner, a cutting depth can be increased. The number and shape of additional cutting inserts and additional insert seats may be appropriately varied under a desired cutting condition or the like.

Incidentally, the cutting insert 1 according to the present invention is not limited to the indexable ball-end mill, and therefore, it is applicable to an indexable ball-end mill in another type or other cutting tools.

Although the description has given of the typical embodiment according to the present invention, the present invention can be variously changed. Replacement or modification may be achieved as long as they do not depart from the spirit and scope of the present invention defined by claims of the present application.

The invention claimed is:

1. A cutting insert comprising a first surface, a second surface opposite to the first surface, and a side surface connecting the first surface and the second surface to each other,
    wherein an intersecting ridge line between the first surface and the side surface includes first and second substantially arcuate ridge lines opposite to each other, the first and second arcuate ridge lines forming first and second arcuate cutting edges, respectively;
    wherein an intersecting ridge line between the second surface and the side surface includes a third substantially arcuate ridge line, the third arcuate ridge line forming a third arcuate cutting edge;
    wherein when a line drawn at a middle point between the first and second arcuate cutting edges is defined as a middle line,
    one of the first and second arcuate cutting edges and the third arcuate cutting edge are located at a side surface on one side of the middle line whereas the other of the first and second arcuate cutting edges is located at a side surface on the other side of the middle line;
    wherein the length of a line segment substantially perpendicular to a tangent drawn on a most expanded portion of each of the first and second arcuate cutting edges is greater than that of a line segment substantially perpendicular to a tangent drawn on each of a most expanded portion of the third arcuate cutting edge and a most expanded portion of an intersecting ridge line between the second surface and the side surface, the intersecting ridge line being opposite to the third arcuate cutting edge; and
    wherein as viewed in a cross section substantially perpendicular to the middle line, an angle formed between the first surface and a straight line which connects the one of the first and second arcuate cutting edges to the third arcuate cutting edge is different from an angle formed between the first surface and a straight line which connects the other of the first and second arcuate cutting edges to the intersecting ridge line between the second surface and the side surface.

2. The cutting insert according to claim 1, wherein the angle formed between the first surface and the straight line which connects the other of the first and second arcuate cutting edges to the intersecting ridge line between the second surface and the side surface is acute.

3. The cutting insert according to claim 2, wherein the angles formed by the straight line connecting the one of the first and second arcuate cutting edges to the third arcuate cutting edge with respect to the first surface and the second surface are substantially right angles.

4. The cutting insert according to claim 1, wherein the second surface has a recess adjacent to the side surface on the other side of the middle line.

5. The cutting insert according to claim 4, wherein the recess is formed in a constant width from a fixing hole penetrating the first surface and the second surface to the side surface on the other side of the middle line.

6. The cutting insert according to claim 1, wherein nicks are formed in a direction substantially perpendicular to the first surface and the second surface are formed at the side surface including the one of the first and second arcuate cutting edges and the third arcuate cutting edge.

7. The cutting insert according to claim 1, wherein the first surface and the second surface each are formed into a shape like an overlapping portion obtained by partly overlapping two circles each other, as viewed on a plane.

8. The cutting insert according to claim 1 to be mounted on a tool body of an indexable ball-end mill.

9. The cutting insert according to claim 8, wherein when the cutting insert is mounted on the tool body of the indexable ball-end mill, the one of the first and second arcuate cutting edges and the third arcuate cutting edge function as peripheral cutting edges that are arranged in such a manner as not to carry out cutting to the rotational axis of the tool body whereas the other of the first and second arcuate cutting edges functions as a central cutting edge arranged in such a manner as to carry out cutting up to a region on the rotational axis.

10. A substantially cylindrical tool body for an indexable ball-end mill, the tool body comprising three insert seats being disposed at a tip portion and being capable of mounting the cutting insert according to claim 1 mounted thereon, wherein the three insert seats include two insert seats for outer peripheral cutting edges and one insert seat for a central cutting edge;

wherein one of the two insert seats for outer peripheral cutting edges is adapted to mount the cutting insert such that one of the first and second arcuate cutting edges is involved in cutting;

wherein the other of the two insert seats for outer peripheral cutting edges is adapted to mount the cutting insert such that the third arcuate cutting edge is involved in cutting; and wherein the insert seat for a central cutting edge such that the other of the first and second arcuate cutting edges is involved in cutting.

11. The tool body according to claim 10, wherein the cutting insert is a cutting insert in which the second surface has a recess adjacent to the side surface on the other side of the middle line;

wherein a projection is formed on an insert seat bottom surface at one of the two insert seats for outer peripheral cutting edges in such a manner as to be brought into contact with an intersecting ridge line between the insert seat bottom surface and an insert seat side surface;

another projection is formed at the insert seat side surface at the other of the insert seats for outer peripheral cutting edges;

a further projection is formed at the insert seat side surface at the insert seat for the central cutting edge in such a manner as to be brought into contact with an intersecting ridge line between the insert seat bottom surface and the outer peripheral surface of the tool body; and the recess of the cutting insert and the projection of each of the insert seats establish an engagement relationship.

12. An indexable ball-end mill comprising:
the tool body according to claim 10; and
the cutting insert according to claim 1 mounted on the tool body.

13. The indexable ball-end mill according to claim 12, wherein the second surface of the cutting insert has a recess adjacent to the side surface on the other side of the middle line;

wherein a projection is formed on an insert seat bottom surface at one of the two insert seats of the tool body for outer peripheral cutting edges in such a manner as to be brought into contact with an intersecting ridge line between the insert seat bottom surface and an insert seat side surface, another projection is formed at the insert seat side surface at the other of the insert seats for outer peripheral cutting edges, and a further projection is formed at the insert seat side surface at the insert seat for the central cutting edge in such a manner as to be brought into contact with an intersecting ridge line between the insert seat bottom surface and the outer peripheral surface of the tool body; and wherein the recess of the cutting insert and the projection of each of the insert seats establish an engagement relationship.

14. A cutting insert comprising:
a top surface and a bottom surface, and a fixing hole passing between the top and bottom surfaces;

first and second side surfaces connecting the top and bottom surfaces, opposite ends of the first side surface converging toward corresponding opposite ends of the second side surface to form first and second vertexes, in both top and bottom views of the cutting insert;

a first arcuate cutting edge formed at an intersection of the first side surface with the top surface;

a second arcuate cutting edge formed at an intersection of the second side surface with the top surface, the first arcuate cutting edge being opposite to the first arcuate cutting edge in a top view of the cutting insert;

a third arcuate cutting edge formed at an intersection of first side surface with the bottom surface;

a fourth intersecting ridge line between the second side surface and the bottom surface, the fourth intersecting ridge line being opposite to the third arcuate cutting edge in a bottom view of the cutting insert; and a middle line extending along a length of the cutting insert, the middle line passing through a middle point between the first and second arcuate cutting edges;

wherein:
a first maximum distance between the first and second arcuate cutting edges in a top view of the cutting insert is greater than a second maximum distance between the third arcuate cutting edge and the fourth intersecting ridge line in a bottom view of the cutting insert; and in a view of the cutting insert along the middle line, a first angle formed between the top surface and a first straight line connecting the first and third arcuate cutting edges is different from a second angle formed between the top surface and a second straight line connecting the second arcuate cutting edge to the fourth intersecting ridge line.

* * * * *